United States Patent
Peyser et al.

(10) Patent No.: US 11,749,259 B2
(45) Date of Patent: Sep. 5, 2023

(54) PROPER NOUN RECOGNITION IN END-TO-END SPEECH RECOGNITION

(71) Applicant: Google LLC, Mountain View, CA (US)

(72) Inventors: Charles Caleb Peyser, New York, NY (US); Tara N. Sainath, Jersey City, NJ (US); Golan Pundak, New York, NY (US)

(73) Assignee: Google LLC, Mountain View, CA (US)

( * ) Notice: Subject to any disclaimer, the term of this patent is extended or adjusted under 35 U.S.C. 154(b) by 87 days.

(21) Appl. No.: 17/150,491

(22) Filed: Jan. 15, 2021

(65) Prior Publication Data
US 2021/0233512 A1    Jul. 29, 2021

Related U.S. Application Data

(60) Provisional application No. 62/966,823, filed on Jan. 28, 2020.

(51) Int. Cl.
| | | |
|---|---|---|
| *G10L 15/06* | (2013.01) | |
| *G10L 15/16* | (2006.01) | |
| *G10L 15/18* | (2013.01) | |
| *G10L 15/187* | (2013.01) | |
| *G06N 3/049* | (2023.01) | |

(52) U.S. Cl.
CPC ............ *G10L 15/063* (2013.01); *G06N 3/049* (2013.01); *G10L 15/16* (2013.01); *G10L 15/187* (2013.01); *G10L 15/1815* (2013.01)

(58) Field of Classification Search
CPC ... G10L 15/063; G10L 15/16; G10L 15/1815; G10L 15/187; G06N 3/049
See application file for complete search history.

(56) References Cited

U.S. PATENT DOCUMENTS

| 11,037,547 B2* | 6/2021 | Wang ..................... G06N 20/00 |
| 2020/0027445 A1 | 1/2020 | Raghunathan et al. |
| 2020/0265831 A1* | 8/2020 | Wang ..................... G06N 3/084 |

FOREIGN PATENT DOCUMENTS

WO    2012165529 A1    12/2012

OTHER PUBLICATIONS

Gong et al., "Sentence-wise smooth regularization for sequence to sequence learning", Proceedings of the AAAI Conference on Artificial Intelligence, vol. 33, No. 01, 2019. (Year: 2019).*

(Continued)

*Primary Examiner* — Michelle M Koeth
(74) *Attorney, Agent, or Firm* — Honigman LLP; Brett A. Krueger; Grant J. Griffith

(57) ABSTRACT

A method for training a speech recognition model with a minimum word error rate loss function includes receiving a training example comprising a proper noun and generating a plurality of hypotheses corresponding to the training example. Each hypothesis of the plurality of hypotheses represents the proper noun and includes a corresponding probability that indicates a likelihood that the hypothesis represents the proper noun. The method also includes determining that the corresponding probability associated with one of the plurality of hypotheses satisfies a penalty criteria. The penalty criteria indicating that the corresponding probability satisfies a probability threshold, and the associated hypothesis incorrectly represents the proper noun. The method also includes applying a penalty to the minimum word error rate loss function.

20 Claims, 8 Drawing Sheets

(56) References Cited

OTHER PUBLICATIONS

Laurent et al., "Improving recognition of proper nouns (in ASR) through generation and filtering of phonetic transcriptions" Computer Speech and Language, Elsevier, 2014, 28 (4), pp. 979-996. 10.1016/j.csl.2014.02.006. hal-01433238 (Year: 2014).*
Chiu et al., "State-of-the-Art Speech Recognition with Sequence-to-Sequence Models," 2018 IEEE International Conference on Acoustics, Speech and Signal Processing (ICASSP), 2018, pp. 4774-4778, doi: 10.1109/ICASSP.2018.8462105. (Year: 2018).*
Sainath et al., "Two-Pass End-to-End Speech Recognition," arXiv:1908.10992v1 [cs.CL], Aug. 29, 2019, https://doi.org/10.48550/arXiv.1908.10992 (Year: 2019).*
He et al., "Streaming End-to-end Speech Recognition for Mobile Devices," arXiv:1811.06621v1 [cs.CL], Nov. 15, 2018 https://doi.org/10.48550/arXiv.1811.06621 (Year: 2018).*
International Search Report, PCT/US2021/013759, dated Apr. 9, 2021, 15 pages.
Peyser et al., "Improving Proper Noun Recognition in End-to-End Asr by Customization of the Mwer Loss Criterion," May 4, 2020, 5 pages.
Alon et al., "Contextual Speech Recognition with Difficult Negative Training Examples," May 12, 2019, 5 pages.
Sainath et al., "Two-Pass End-to-End Speech Recognition," Aug. 29, 2019, 5 pages.
Indian Office Action for the related Application No. 202227037326, dated Nov. 23, 2022, 8 pages.
Indian Examination Report for the related Indian Application No. 202227037326, dated Nov. 18, 2022, 5 pages.

* cited by examiner

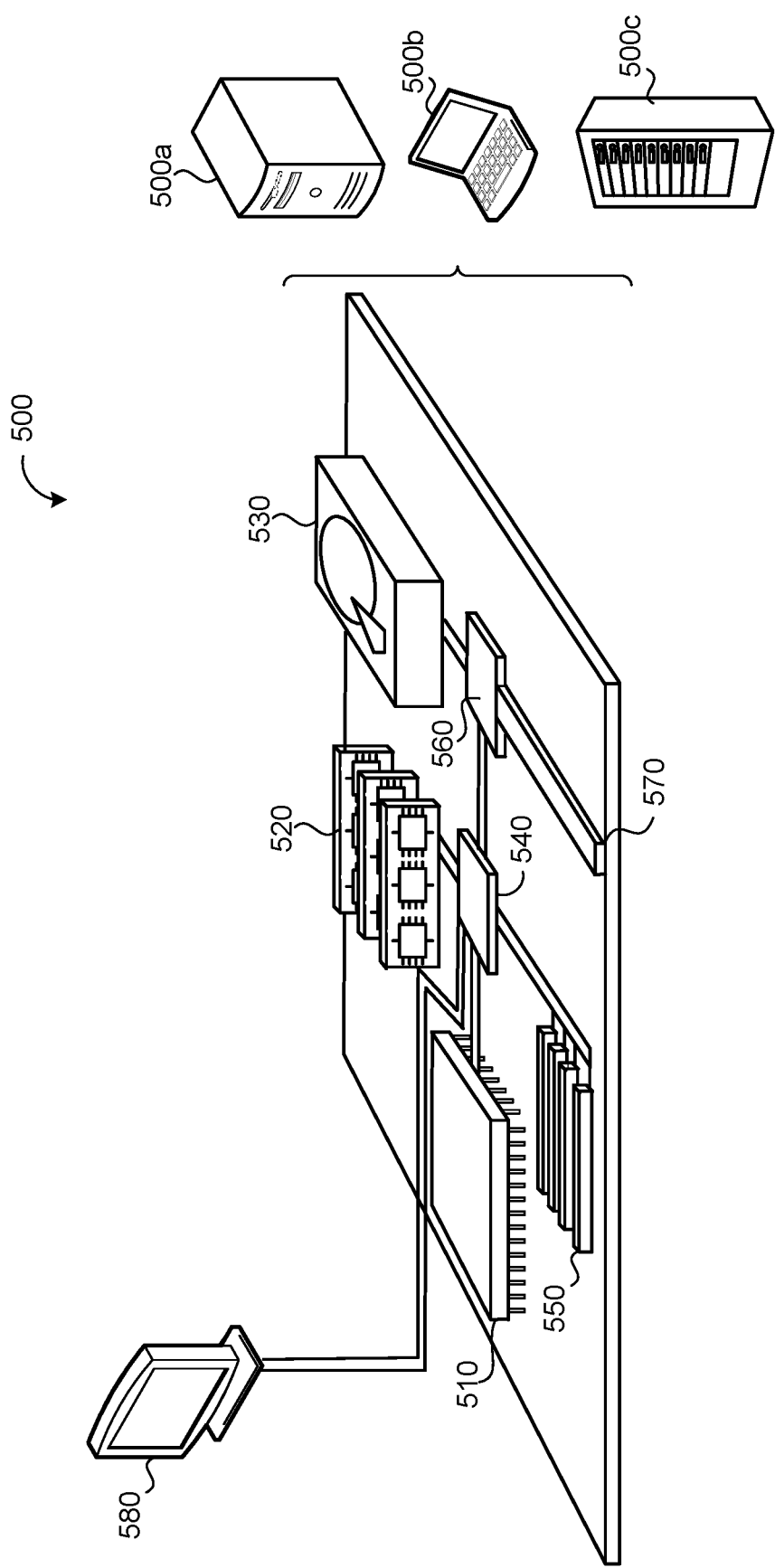

PROPER NOUN RECOGNITION IN END-TO-END SPEECH RECOGNITION

CROSS REFERENCE TO RELATED APPLICATIONS

This U.S. patent application claims priority under 35 U.S.C. § 119(e) to U.S. Provisional Application 62/966,823, filed on Jan. 28, 2020. The disclosure of this prior application is considered part of the disclosure of this application and is hereby incorporated by reference in its entirety.

TECHNICAL FIELD

This disclosure relates to proper noun recognition end-to-end speech recognition.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the present disclosure provides a computer-implemented method that when executed on data processing hardware causes the data processing hardware to perform operations that include training a speech recognition model with a minimum word error rate loss function by: receiving a training example including a proper noun; generating a plurality of hypotheses corresponding to the training example, each hypothesis of the plurality of hypotheses representing the proper noun and comprising a corresponding probability that indicates a likelihood that the hypothesis represents the proper noun; determining that the corresponding probability associated with one of the plurality of hypotheses satisfies a penalty criteria; and applying a penalty to the minimum word error rate loss function. The penalty criteria indicates that the corresponding probability satisfies a probability threshold, and the associated hypothesis incorrectly represents the proper noun.

Implementations of the disclosure may include one or more of the following optional features. In some implementations, the speech recognition model includes a two-pass architecture including: a first pass network including a recurrent neural network transducer (RNN-T) decoder; and a second pass network including a listen-attend-spell (LAS) decoder. In these implementations, the speech recognition model may further include a shared encoder that encodes acoustic frames for each of the first pass network and the second pass network. The training with the minimum word error rate loss function in these implementations may occur at the LAS encoder. The operations may further include training the RNN-T decoder, and prior to training the LAS decoder with the minimum word error rate loss function, training the LAS decoder while parameters of the trained RNN-T decoder remain fixed.

In some examples, the corresponding probability satisfies the probability threshold when the corresponding probability is greater than the corresponding probabilities associated with the other hypothesis. The operations may further include assigning the probability to each hypothesis of the plurality of hypotheses. In some implementations, the operations further include receiving an incorrect hypothesis and assigning a respective probability to the incorrect hypothesis, wherein the penalty criteria further includes an indication that the hypothesis includes the generated incorrect hypothesis. In these examples, the incorrect hypothesis may include a phonetically similarity to the proper noun and/or the operations may further include substituting the incorrect hypothesis for a generated hypothesis of the plurality of hypotheses.

Another aspect of the disclosure provides a system that includes data processing hardware and memory hardware in communication with the data processing hardware and storing instructions that when executed by the data processing hardware cause the data processing hardware to perform operations that include training a speech recognition model with a minimum word error rate loss function by: receiving a training example including a proper noun; generating a plurality of hypotheses corresponding to the training example, each hypothesis of the plurality of hypotheses representing the proper noun and comprising a corresponding probability that indicates a likelihood that the hypothesis represents the proper noun; determining that the corresponding probability associated with one of the plurality of hypotheses satisfies a penalty criteria; and applying a penalty to the minimum word error rate loss function. The penalty criteria indicates that the corresponding probability satisfies a probability threshold, and the associated hypothesis incorrectly represents the proper noun.

This aspect may include one or more of the following optional features. In some implementations, the system further includes a first pass network comprising a recurrent neural network transducer (RNN-T) decoder, and a second pass network comprising a listen-attend-spell (LAS) decoder, wherein the speech recognition model comprises the first pass network and the second pass network. In these implementations, the system may also include a shared encoder configured to encode acoustic frames for each of the first pass network and the second pass network. Training with the minimum word error rate loss function in these implementations may occur at the LAS decoder. The operations may further include training the RNN-T decoder, and prior to training the LAS decoder with the minimum word error rate loss function, training the LAS decoder while parameters of the trained RNN-T decoder remain fixed.

In some examples, the corresponding probability satisfies the probability threshold when the corresponding probability is greater than the corresponding probabilities associated with the other hypothesis. The operations may further include assigning the probability to each hypothesis of the plurality of hypotheses. In some implementations, the operations further include receiving an incorrect hypothesis and assigning a respective probability to the incorrect hypothesis, wherein the penalty criteria further includes an indication that the hypothesis includes the generated incorrect hypothesis. In these examples, the incorrect hypothesis may include a phonetically similarity to the proper noun and/or the operations may further include substituting the incorrect hypothesis for a generated hypothesis of the plurality of hypotheses.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a schematic view of an example computing device that may be used to implement the systems and methods described herein.

Like reference symbols in the various drawings indicate like elements.

DETAILED DESCRIPTION

Figure 1A:
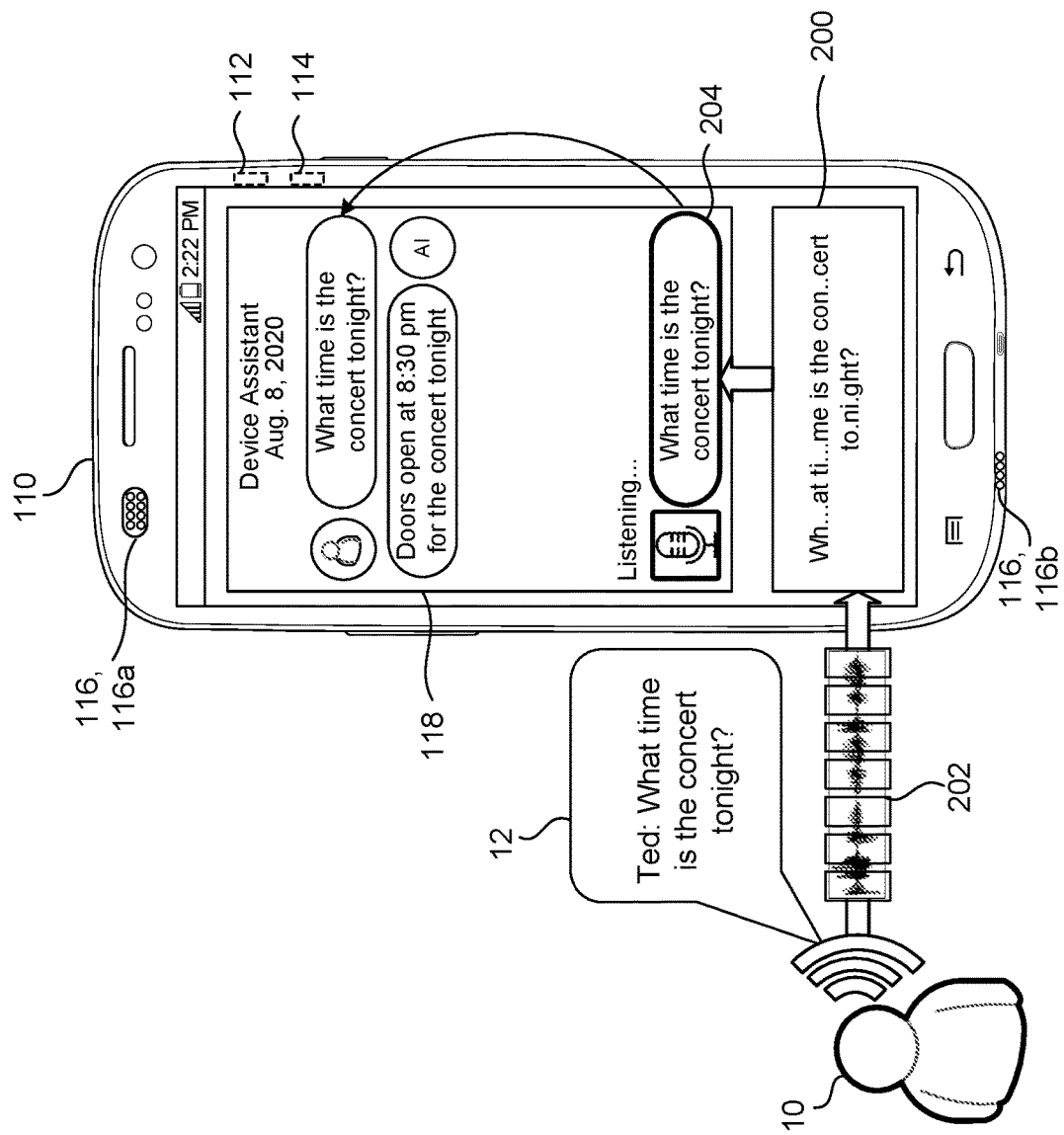
FIGS. 1A and 1B are schematic views of example speech environments using a two-pass speech recognition architecture with a joint acoustic and text model.

Speech recognition continues to evolve to meet the untethered and the nimble demands of a mobile environment. New speech recognition architectures or improvements to existing architectures continue to be developed that seek to increase the quality of automatic speech recognition systems (ASR). To illustrate, speech recognition initially employed multiple models where each model had a dedicated purpose. For instance, an ASR system included an acoustic model (AM), a pronunciation model (PM), and a language model (LM). The acoustic model mapped segments of audio (i.e., frames of audio) to phonemes. The pronunciation model connected these phonemes together to form words while the language model was used to express the likelihood of given phrases (i.e., the probability of a sequence of words). Yet although these individual models worked together, each model was trained independently and often manually designed on different datasets.

The approach of separate models enabled a speech recognition system to be fairly accurate, especially when the training corpus (i.e., body of training data) for a given model caters to the effectiveness of the model, but needing to independently train separate models introduced its own complexities and led to an architecture with integrated models. These integrated models sought to use a single neural network to directly map an audio waveform (i.e., input sequence) to an output sentence (i.e., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and able to run offline (i.e., without a network connection); therefore, avoiding unreliability issues with communication networks.

In addition to speech recognition systems operating with low latency, a speech recognition system also needs to be accurate at recognizing speech. Often for models that perform speech recognition, a metric that may define an accuracy of a model is a word error rate (WER). A WER refers to a measure of how many words are changed compared to a number of words actually spoken. Commonly, these word changes refer to substitutions (i.e., when a word gets replaced), insertions (i.e., when a word is added), and/or deletions (i.e., when a word is omitted). To illustrate, a speaker says "car," but an ASR system transcribes the word "car" as "bar." This is an example of a substitution due to phonetic similarity. When measuring the capability of an ASR system compared to other ASR systems, the WER may indicate some measure of improvement or quality capability relative to another system or some baseline.

Although an RNN-T model showed promise as a strong candidate model for on-device speech recognition, the RNN-T model alone still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. To capitalize on the quality of a non-steaming E2E LAS model, a two-pass speech recognition system (e.g., shown in FIG. 2) developed that includes a first-pass component of an RNN-T network followed by a second-pass component of a LAS network. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is reasonably slight and complies with latency constraints for on-device operation. With respect to accuracy, a two-pass model achieves a 17-22% WER reduction when compared to a RNN-T alone and has a similar WER when compared to a large conventional model.

Yet a two-pass model with an RNN-T network first pass and a LAS network second pass still has its tradeoffs, particularly with rare or uncommon words. These types of words may be referred to as tail utterances and are inherently more difficult for speech systems to transcribe by virtue of their ambiguity, rareness in training, or unusual verbalization. Examples of tail utterances include accented speech, cross-lingual speech, numerics, and proper nouns. For instance, proper nouns present a challenge for streaming ASR with a two-pass model because a particular name may appear only rarely, or not at all, during training yet potentially have a pronunciation that is similar to a more common word. Traditionally, a conventional model may optimize a pronunciation model (PM) to improve tail performance by injecting knowledge of the pronunciation of proper nouns. Unfortunately, a two-pass architecture lacks an explicit pronunciation model (PM) that can be specifically trained with proper noun pronunciations and a language model (LM) that can be trained on a large corpus with greater exposure to proper nouns. Without a PM as a specific site for the injection of proper known knowledge in a streaming two-pass system, it is more difficult to model specific requirements like proper noun pronunciation. Although, some models have attempted to improve on issues with uncommon/rare words by incorporating additional training data or models, these techniques increase model size, training time, and/or inference cost.

To increase a two-pass model's effectiveness on proper nouns and/or other tail utterances, the two-pass architecture uses a customized minimum word error rate (MWER) loss criteria. This loss criteria specifically seeks to emphasize proper noun recognition. By using loss criteria to improve proper noun recognition, the speech recognition system does not need new data during training or external models during inference. Here, two different methods of loss criteria may be used for proper noun recognition. The first method includes an entity tagging system that identifies proper nouns in ground truth transcripts and increases the loss for hypotheses that miss a proper noun during training. The second method injects additional hypotheses to the MWER beam where the additional hypotheses correspond to proper nouns that have been replaced by phonetically similar alternatives. For instance, an additional hypothesis of "Hallmark" is added as a phonetically similar alternative to "Walmart." In the second approach, the process of training makes the model aware of possible mistakes and potential alternatives. On a variety of proper noun test sets, these custom loss criteria methods may achieve a 2-7% relative reduction in WER when compared to a traditional two-pass architecture without custom loss criteria.

Figure 1B:
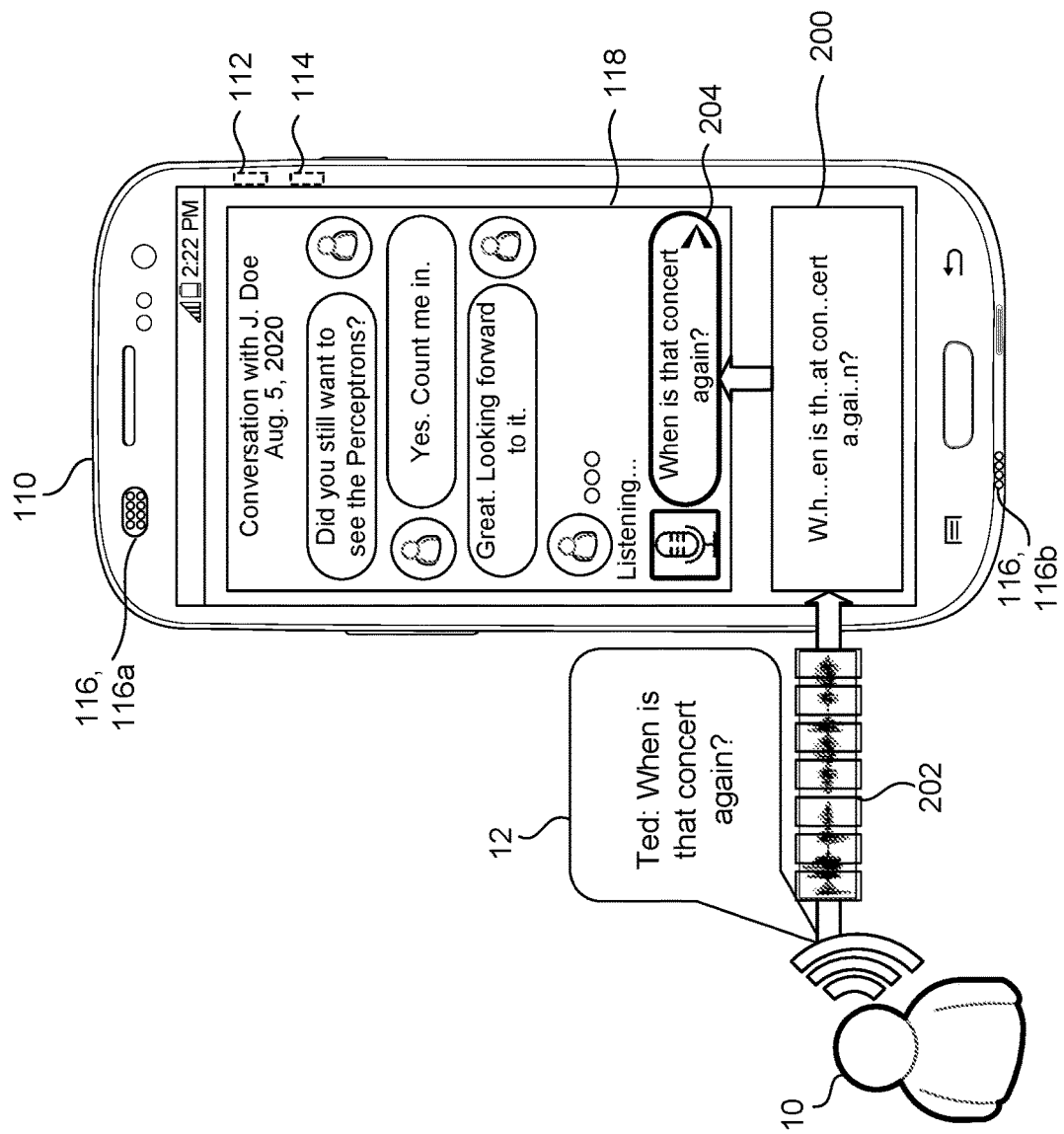

FIGS. 1A and 1B are examples of a speech environment 100. In the speech environment 100 a user's 10 manner of interacting with a computing device, such as a user device 110, may be through voice input. The user device 110 (also referred to generally as a device 110) is configured to capture sounds (e.g., streaming audio data) from one or more users 10 within the speech-enabled environment 100. Here, the streaming audio data 12 may refer to a spoken utterance by the user 10 that functions as an audible query, a command for the device 110, or an audible communication captured by the device 110. Speech-enabled systems of the device 110 may field the query or the command by answering the query and/or causing the command to be performed.

The user device 110 may correspond to any computing device associated with a user 10 and capable of receiving audio data 12. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116. The user device 110 (e.g., using the hardware 112, 114) is further configured to perform speech recognition processing on the streaming audio data 12 using a speech recognizer 200. In some examples, the audio subsystem 116 of the user device 110 that includes the audio capture device 116a is configured to receive audio data 12 (e.g., spoken utterances) and to convert the audio data 12 into a digital format compatible with the speech recognizer 200. The digital format may correspond to acoustic frames (e.g., parameterized acoustic frames), such as mel frames. For instance, the parameterized acoustic frames correspond to log-mel fiterbank energies.

In some examples, such as FIG. 1A, the user 10 interacts with a program or application 118 of the user device 110 that uses the speech recognizer 200. For instance, FIG. 1A depicts the user 10 communicating with an automated assistant application. In this example, the user 10 asks the automated assistant, "What time is the concert tonight?" This question from the user 10 is a spoken utterance 12 captured by the audio capture device 116a and processed by audio subsystems 116 of the user device 110. In this example, the speech recognizer 200 of the user device 110 receives the audio input 202 (e.g., as acoustic frames) of "what time is the concert tonight" and transcribes the audio input 202 into a transcription 204 (e.g., a text representation of "what time is the concert tonight?"). Here, the automated assistant of the application 118 may respond to the question posed by the user 10 using natural language processing. Natural language processing generally refers to a process of interpreting written language (e.g., the transcription 204) and determining whether the written language prompts any action. In this example, the automated assistant uses natural language processing to recognize that the question from the user 10 regards the user's schedule and more particularly a concert on the user's schedule. By recognizing these details with natural language processing, the automated assistant returns a response to the user's query where the response states, "Doors open at 8:30 pm for the concert tonight." In some configurations, natural language processing may occur on a remote system in communication with the data processing hardware 112 of the user device 110.

FIG. 1B is another example of speech recognition with the speech recognizer 200. In this example, the user 10 associated with the user device 110 is communicating with a friend named Jane Doe with a communication application 118. Here, the user 10 named Ted, communicates with Jane by having the speech recognizer 200 transcribe his voice inputs. The audio capture device 116 captures these voice inputs and communicates them in a digital form (e.g., acoustic frames) to the speech recognizer 200. The speech recognizer 200 transcribes these acoustic frames into text that is sent to Jane via the communication application 118. Because this type of application 118 communicates via text, the transcription 204 from the speech recognizer 200 may be sent to Jane without further processing (e.g., natural language processing).

Figure 2:
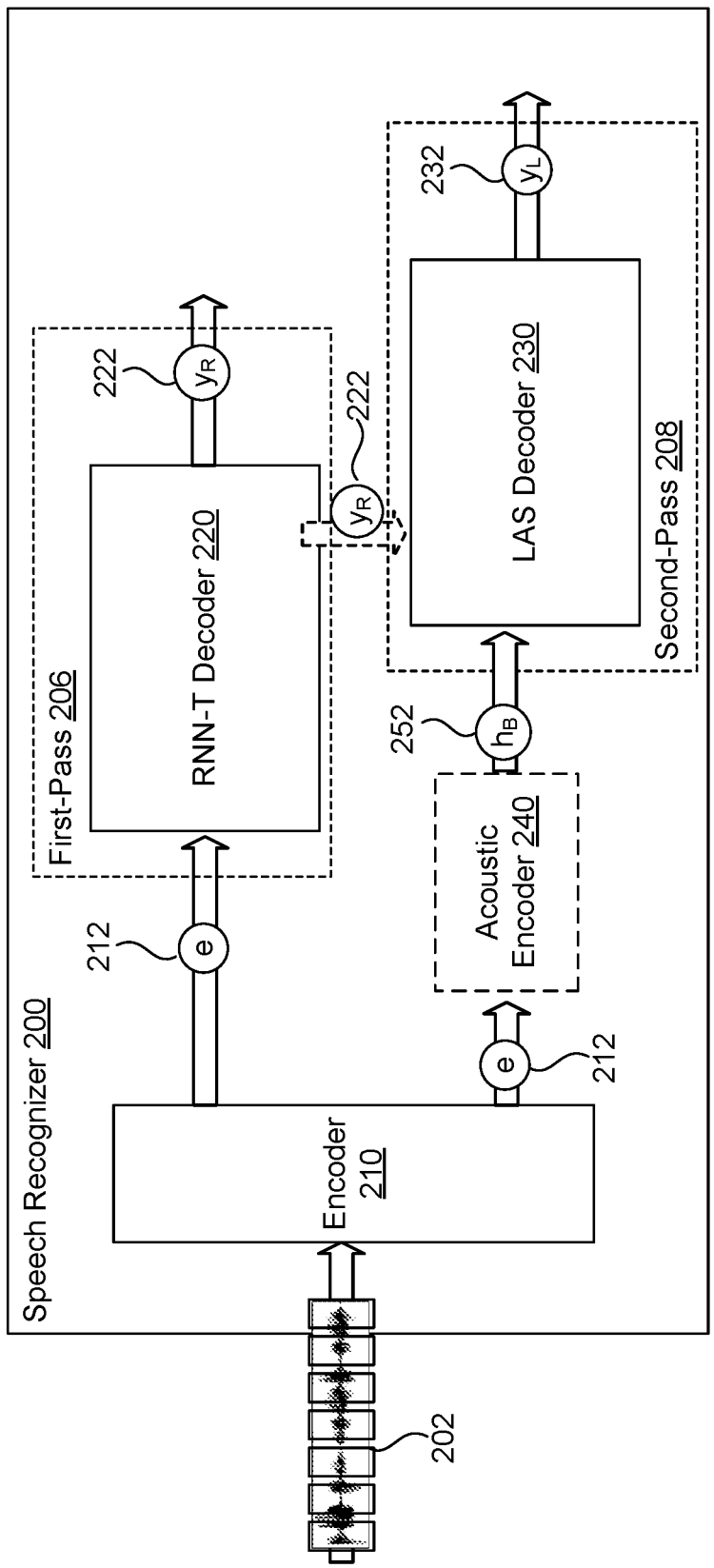
FIG. 2 is a schematic view of an example two-pass speech recognition architecture for speech recognition.

In some examples, such as FIG. 2, the speech recognizer 200 is configured in a two-pass speech recognition architecture (or simply "two-pass architecture"). Generally speaking, the two-pass architecture of the speech recognizer 200 includes at least one encoder 210, an RNN-T decoder 220, and a LAS decoder 230. In two-pass decoding, the second pass 208 (e.g., shown as the LAS decoder 230) may improve the initial outputs from the first pass 206 (e.g., shown as the RNN-T decoder 220) with techniques such as lattice rescoring or n-best re-ranking. In other words, the RNN-T decoder 220 produces streaming predictions (e.g., a set of N-best hypotheses) and the LAS decoder 230 finalizes the prediction (e.g., identifies 1-best rescored hypothesis).

Here, specifically, the LAS decoder 230 rescores streamed hypotheses $y_R$ from the RNN-T decoder 220. Although it is generally discussed that the LAS decoder 230 functions in a rescoring mode that rescores streamed hypotheses $y_R$ from the RNN-T decoder 220, the LAS decoder 230 is also capable of operating in different modes, such as a beam search mode, depending on design or other factors (e.g., utterance length).

The at least one encoder 210 is configured to receive, as an audio input 202, acoustic frames corresponding to streaming audio data 12. The acoustic frames may be previously processed by the audio subsystem 116 into parameterized acoustic frames (e.g., mel frames and/or spectral frames). In some implementations, the parameterized acoustic frames correspond to log-mel filterbank energies with log-mel features. For instance, the parameterized input acoustic frames that are output by the audio subsystem 116 and that are input into the encoder 210 may be represented as $x=(x_1, \ldots, x_T)$, where $x_t \in \mathbb{R}^d$ are log-mel filterbank energies, T denotes the number of frames in x, and d represents the number of log-Mel features. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be downsampled (e.g., to a 30 millisecond frame rate). Based on the audio input 202, the encoder 210 is configured to generate an encoding e. For example, the encoder 210 generates encoded acoustic frames (e.g., encoded mel frames or acoustic embeddings).

Although the structure of the encoder 210 may be implemented in different ways, in some implementations, the encoder 210 is a long-short term memory (LSTM) neural network. For instance, the encoder 210 includes eight LSTM layers. Here, each layer may have 2,048 hidden units followed by a 640-dimensional projection layer. In some examples, a time-reduction layer is inserted with the reduction factor N=2 after the second LSTM layer of encoder 210.

In some configurations, the encoder 210 is a shared encoder network. In other words, instead of each pass network 206, 208 having its own separate encoder, each pass 206, 208 shares a single encoder 210. By sharing an encoder, an ASR speech recognizer 200 that uses a two-pass architecture may reduce its model size and/or its computational cost. Here, a reduction in model size may help enable the speech recognizer 200 to function well entirely on-device.

In some examples, the speech recognizer 200 of FIG. 2 also includes an additional encoder, such as an acoustic encoder 240, to adapt the encoder 210 output 212 to be suitable for the second pass 208 of the LAS decoder 230. The acoustic encoder 240 is configured to further encode the output 212 into the encoded output 252. In some implementations, the acoustic encoder 240 is a LSTM encoder (e.g., a two-layer LSTM encoder) that further encodes the output 212 from the encoder 210. By including an additional encoder, the encoder 210 may still be preserved as a shared encoder between passes 206, 208.

During the first pass 206, the encoder 210 receives each acoustic frame of the audio input 202 and generates an output 212 (e.g., shown as the encoding e of the acoustic frame). The RNN-T decoder 220 receives the output 212 for each frame and generates an output 222, shown as the hypothesis $y_R$, at each time step in a streaming fashion. In other words, the RNN-T decoder 220 may consume the frame-by-frame embeddings e, or outputs 212, and generate word piece outputs 222 as hypotheses. In some examples, the RNN-T decoder 220 generates N-best hypotheses 222 by running a beam search based on the received encoded acoustic frames 212. For the structure of the RNN-T decoder 220, the RNN-T decoder 220 may include a prediction network and a joint network. Here, the prediction network may have two LSTM layers of 2,048 hidden units and a 640-dimensional projection per layer as well as an embedding layer of 128 units. The outputs 212 of the encoder 210 and the prediction network may be fed into the joint network that includes a softmax predicting layer. In some examples, the joint network of the RNN-T decoder 220 includes 640 hidden units followed by a softmax layer that predicts 4,096 mixed-case word pieces.

In the two-pass model of FIG. 2, during the second pass 208, the LAS decoder 230 receives the output 212 from the encoder 210 for each frame and generates an output 232 designated as the hypothesis $y_L$. When the LAS decoder 230 operates in a beam search mode, the LAS decoder 230 produces the output 232 from the output 212 alone; ignoring the output 222 of the RNN-T decoder 220. When the LAS decoder 230 operates in the rescoring mode, the LAS decoder 230 obtains the top-K hypotheses 222, $y_R$ from the RNN-T decoder 220 (e.g., corresponding to the N-best hypotheses generated by the RNN-T decoder 220) and then the LAS decoder 230 is run on each sequence in a teacher-forcing mode, with attention on the output 212, to compute a score. For example, a score combines a log probability of the sequence and an attention coverage penalty. The LAS decoder 230 selects a sequence with the highest score to be the output 232. In other words, the LAS decoder 230 may choose a single hypothesis $y_R$ with a maximum likelihood from the N-best list of hypotheses 222 from the RNN-T decoder 220. Here, in the rescoring mode, the LAS decoder 230 may include multi-headed attention (e.g., with four heads) to attend to the output 212. Furthermore, the LAS decoder 230 may be a two-layer LAS decoder 230 with a softmax layer for prediction. For instance, each layer of the LAS decoder 230 has 2,048 hidden units followed by a 640-dimensional projection. The softmax layer may include 4,096 dimensions to predict the same mixed-case word pieces from the softmax layer of the RNN-T decoder 220.

Figure 3A:
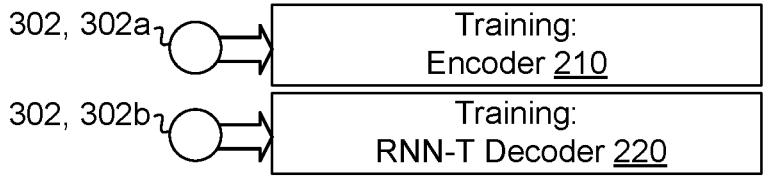
FIGS. 3A-3C are schematic views of example training procedures for training the speech recognition two-pass architecture of FIG. 2.
Figure 3A:
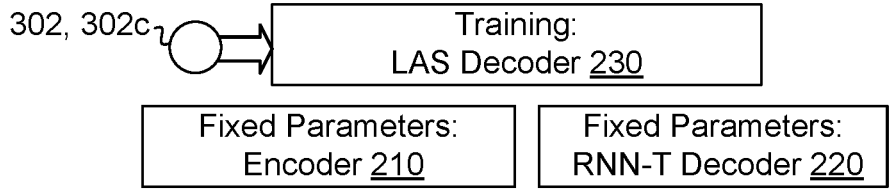
Figure 3A:
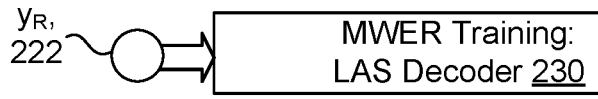
Figure 3B:
Figure 3B:
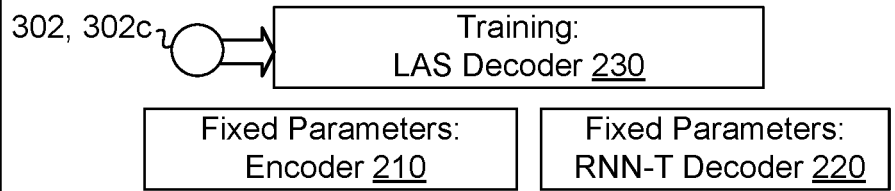
Figure 3B:
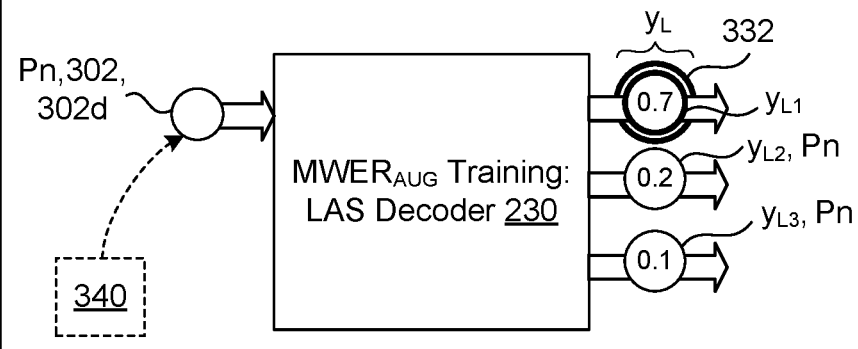
Figure 3C:
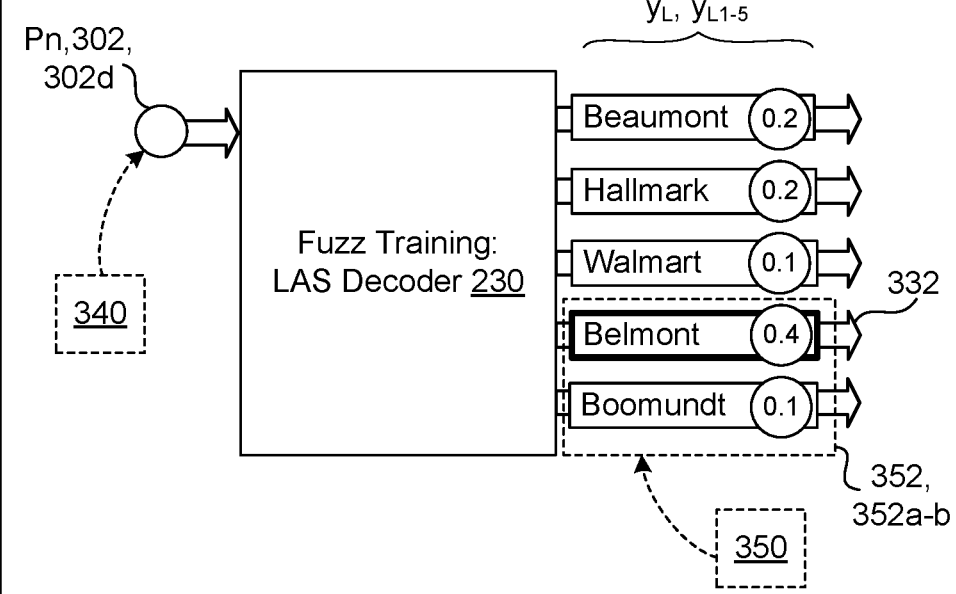

A neural network is generally trained by backpropagation that defines a loss function (e.g., a cross-entropy loss function). For instance, the loss function is defined as a difference between the actual outputs of the network and the desired outputs of the network. To train a model with a cross-entropy (CE) loss function, the model trains to optimize the CE loss function by maximizing the log-likelihood of the training data. Referring to FIGS. 3A-C, a training procedure 300 may train each component of the speech recognizer 200 on a corresponding set of training data 302, 302a-d (FIG. 3). For example, the training procedure 300 for training the two-pass model architecture of the speech recognizer 200 of FIG. 2 may occur in three stages 310, 320, 330. During the first stage 310, the training procedure 300 trains the encoder 310 and the RNN-T decoder 220 (e.g., using a CE loss function). In some examples, the training procedure 300 trains the encoder 210 and the RNN-T decoder 220 to maximize $P(y_R=y|x)$. During the second stage 320, the training procedure 300 trains the LAS decoder 230 without updating parameters of the encoder 210 or the RNN-T decoder 220. In some implementations, the training procedure 300 trains the LAS decoder 230 using cross-entropy, teaching forcing loss. For instance, the training procedure 300 trains the LAS decoder 230 to maximize $P(y_L=y|x)$. During the third stage 330, the training procedure 300 further trains the LAS decoder 230 with a minimum WER (MWER) loss to optimize the expected word error rate by using n-best hypotheses. For example, the WER objective function models the loss as a weighted average of word errors in an N-best beam of hypotheses 222. During this third stage 330, the LAS decoder 230 may be fined tuned according to the WER objective function represented by the following equation:

$$L_{MWER}(x, y^*) = \sum_{y \in B_{LAS}} P(y|x)\hat{W}(y|y^*) \quad (1)$$

where y* is the ground truth, $B_{LAS}$ is an N-best list of hypotheses from the LAS decoder 230 during a beam search, P(y|x) is the normalized posterior for the hypothesis y, and $\hat{W}(y|y^*)$ represents the difference between a number of word errors in the hypothesis y and an average number of word errors across the beam. In some implementations, when the LAS decoder 230 functions as a rescorer, the LAS decoder 230 trains to optimize assigning a high likelihood to the best hypothesis $y_R$ from the RNN-T decoder 220. Here, this loss optimization function may be represented by the following equation.

$$L_{MWER}(x, y^*) = \sum_{y \in B_{RNN-T}} P(y|x)\hat{W}(y|y^*) \quad (2)$$

where $B_{RNN-T}$ is obtained from the beam search on the RNN-T decoder 220. Here, each of these optimization models indicate that the loss criteria represents a distribution over which the speech recognizer 200 or part thereof should learn to assign a probability mass.

Referring to FIG. 3B, in some implementations, during the third training stage 330 or fine-tuning stage, the training procedure 300 performs training using MWER loss, but with a modified loss function $MWER_{AUG}$. Here, the modified loss function $MWER_{AUG}$ is a form of proper noun loss augmentation. In this training approach, the loss is configured to emphasize proper noun performance in training. In some examples, the loss emphasizes proper noun performance by increasing a penalty 332 applied to the model (e.g., the LAS decoder 230) when the model assigns a high probability to a hypothesis y that misses a proper noun correctly. To illustrate, FIG. 3B depicts that during the third stage 330 of the training procedure 300, the LAS decoder 230 generates a set of likely hypotheses $y_L$, $y_{L1-3}$ that predicts the input 302d. Here, the input 302d includes a proper noun Pn, but the LAS decoder 230 identifies a first hypothesis $y_{L1}$ being the highest probability hypothesis $y_L$ for the input 302d even though it does not actually include the proper noun Pn. In this example, the modified loss function $MWER_{AUG}$ applies the penalty 332 because the LAS decoder 230 assigned the highest probability hypothesis $y_L$ to a hypothesis $y_L$ that incorrectly identified the proper noun Pn. In some configurations, the training procedure 300 determines that the model (e.g., the LAS decoder 230) has assigned a probability to a hypothesis y that satisfies penalty criteria. The penalty criteria may include that the model assigned a probability to an incorrect hypothesis for the proper noun that satisfies a probability threshold (e.g., exceeds a value assigned to the probability threshold). Here, the probability threshold may be a preconfigured value that indicates an acceptable level or value for an incorrect hypothesis. In these examples, when the training procedure 300 determines that the model (e.g., the LAS decoder 230) has assigned a probability to a hypothesis y that satisfies penalty criteria, the training procedure 300 applies a penalty 332 to the modified loss function. In some examples, the modified loss function for proper noun loss augmentation is represented by the following equations:

$$L_{AUG}(x, y^*) = \sum_{y \in B_{RNN-T}} P(y|x)\hat{W}(y|y^*) \cdot C_\lambda(y|y^*) \quad (3)$$

where $$C_\lambda(y, y^*) = \begin{cases} \lambda & \text{if } y^* \text{ includes a proper noun that is not in } y \\ 1, & \text{otherwise} \end{cases} \quad (4)$$

for some constant $\lambda > 1$. Here, $\lambda$ refers to a hyper parameter selected to balance the effectiveness of proper noun recognition with respect to performance of the speech recognizer 200 for general utterances 12. For example, configuration of the hyper parameter $\lambda$ tries to avoid increasing the gradient originating from proper nouns errors at the tradeoff of other error types. In some configurations, proper nouns Pn for each ground-truth transcription (e.g., training data 302d) are identified prior to training by a proper noun identification system 340. To ensure that a hypothesis y includes a proper noun Pn, a hypothesis y is defined as including the proper noun Pn when a hypothesis y contains an entire word sequence of the proper noun Pn in an appropriate order. For example, the proper noun Pn "Cedar Rapids" is contained in the hypothesis "Population of Cedar Rapids," but not in the hypothesis "Cedar tree height" or "Cedar Rapidsss."

FIG. 3C illustrates another example of the training procedure 300 that applies fuzz training to optimize the ability of the speech recognizer 200 to distinguish proper nouns. In this approach, the fuzz training aims to teach the speech recognizer 200 how to distinguish between proper nouns and phonetically similar, incorrect alternatives. In other words, in fuzz training a model, such as the speech recognizer 200, permits the model to gain knowledge of possible mistakes and alternative spellings. During training, when the model (e.g., the LAS decoder 230) assigns a high likelihood to a proper noun mistake, the training procedure 300 imposes a penalty 332 on the model. By imposing the penalty 332, the training intends to decrease the likelihood of a similar error in the future.

To train the speech recognizer 200 (e.g., the LAS decoder 230 of the speech recognizer 200) on these potential mistakes, the fuzz training may perform beam modification. Generally speaking, a beam search includes a beam size or beam width parameter B that specifies how many of the best potential solutions (e.g., hypotheses or candidates) to evaluate. The fuzz training may leverage the beam size B by either replacing hypotheses y from the beam search or expanding on a number of hypotheses y from the beam search. To illustrate, FIG. 3C is an example that depicts a beam search with a beam size of five corresponding to the five hypotheses $y_L, y_{L1-5}$ or a beam size of three that has been expanded to the five hypotheses $y_L, y_{L1-5}$. In this example, when the beam size is five, a fuzzing system 350 may replace two of the hypotheses with incorrect proper noun alternatives 352, 352a-b. Similarly, when the beam size is three, the fuzzing system 350 may generate additional hypotheses y with incorrect proper noun alternatives 352, 352a-b. In some implementations, the fuzzing system 350 generates the proper noun alternatives 352 using a technique called phonetic fuzzing that generates alternatives 352 that are phonetically similar to the proper noun Pn contained with the training data 302. With phonetic fuzzing, the fuzzing system 350 may even generate new words or alternative spellings that a more traditional corpus of training data 302 may not have emphasized or included. For hypothesis $y \in B_{RNN-T}$ and corresponding to the ground truth y*, the fuzz operation may be represented by the following equation:

$$\text{Fuzz}(y, y^*) = \begin{cases} y^{fuzz} & \text{if } y^* \text{ and } y \text{ share a proper noun} \\ y, & \text{otherwise} \end{cases} \quad (5)$$

In some configurations, the fuzz hypothesis $y^{fuzz}$ is formed by copying y and then replacing an occurrence of the proper noun Pn with a phonetically similar alternative 352. In fuzz training, the loss function is defined by combining the original beam from the RNN-T decoder 220 with an alternative 352 (also referred to as a fuzz or fuzz hypothesis). The following equation may represent the loss function during the training procedure 300 with fuzz training:

$$L_{Fuzz}(x, y^*) = \sum_{y \in B_{RNN-T} \cup Fuzz(B_{RNN-T})} P(y|x)\hat{W}(y|y^*) \quad (6)$$

where P(y|x) corresponds to the renormalized posterior that accounts for the modified beam size (e.g., as represented by the additional term "Fuzz($B_{RNN-T}$)"). In some implementations, the loss function L of the fuzz training also includes a hyper parameter $\tau$ where $0 \leq \tau \leq 1$ such that the hyper parameter defines the probability of using the fuzz training loss function $L_{Fuzz}$. In these implementations, when the training procedure 300 does not use the fuzz training loss function $L_{Fuzz}$, the training procedure 300 uses the loss function as represented by equation (2). Although the hyper parameter T may be set to any probability, in some configurations, the hyper parameter is set to 1 such that the training procedure 300 always incorporates the fuzz training loss function $L_{Fuzz}$.

In some configurations, the training procedure 300 determines a set number of alternatives 352 (e.g., twenty five alternatives 352) for each proper noun Pn included in the training data set 302 prior to fuzz training. Here, the number of alternatives 352 generated before fuzz training may be configured to ensure the diversity of alternatives 352 while minimizing computational expense. When the training procedure 300 generates the set number of alternatives 352 before fuzz training, during fuzz training, the training procedure 300 may then select random alternatives 352 that have already been generated as needed.

With continued reference to FIG. 3C, during the third stage 330, the training procedure 300 uses fuzz training to train the LAS decoder 230. Here, the LAS decoder 230 receives training data 302, 302d that includes a proper noun Pn and generates five hypotheses $y_L, y_{L1-5}$ corresponding to the proper noun Pn of the training data 302d (e.g., a beam width B=5). The LAS decoder 230 also assigns each hypothesis $y_L$ a probability (e.g., shown as 0.2, 0.2, 0.1, 0.4, and 0.1) that indicates a likelihood at which the LAS decoder 230 thinks that particular hypothesis correctly identifies the input (e.g., the training data 302). In this example, the fuzzing system 350 generates or selects (e.g., if alternatives 352 are generated prior to fuzz training) two fuzz hypotheses 352a-b to include in the set of potential hypotheses $y_L$, "Belmont" and "Boomundt." As illustrated in the example, the LAS decoder 230 assigns the highest likelihood (e.g., shown as 0.4) to the incorrect alternative "Belmont" 352a. Because the LAS decoder 230 assigns the highest likelihood to an incorrect alternative 352, the training procedure 300 applies a penalty 332 to the fuzz training loss function $L_{Fuzz}$. Here, a penalty, such as the penalty 332, provides feedback during training to adjust weights or parameters of a neural network. Generally speaking, a penalty functions to steer weights applied to a particular input to approach or indicate the intended output rather than an unwanted or inaccurate output. In other words, the penalty 332 functions to reduce the likelihood that the LAS decoder 230 would in the future indicate that an incorrect alternative 352 is likely the best hypothesis y.

Figure 4:
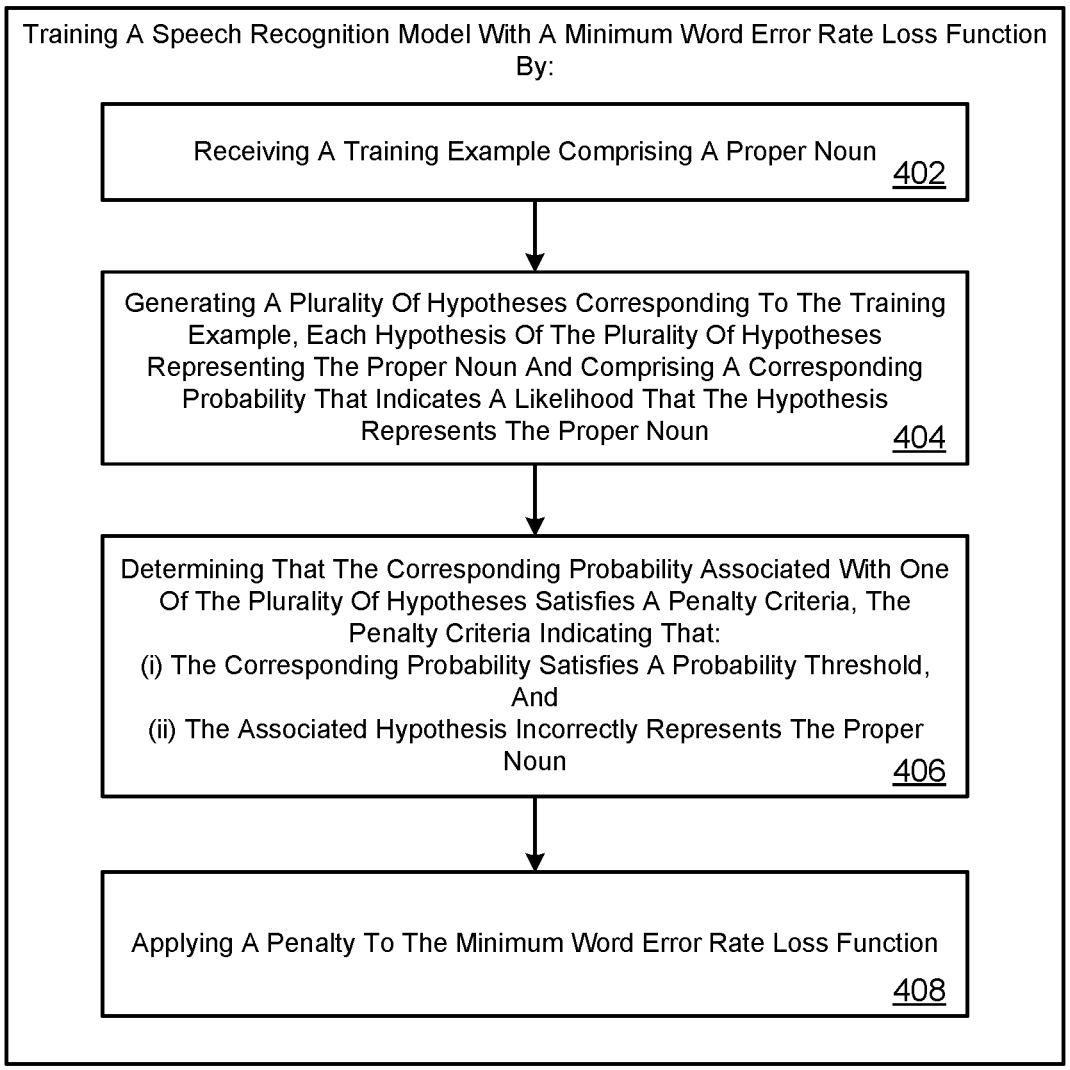
FIG. 4 is a flowchart of example arrangement of operations for a method of training the two-pass speech recognition architecture of FIG. 2.

FIG. 4 is a flowchart of an example arrangement of operations for a method 400 of training a speech recognition model (e.g., the speech recognizer 200). The method 400 trains a speech recognition model with a minimum word error rate (MWER) loss function by operations 402-408. At operation 402, the method 400 receives a training example 302 that includes a proper noun Pn. At operation 404, the method 400 generates a plurality of hypotheses y corresponding to the training example 302. Here, each hypothesis y of the plurality of hypotheses represents the proper noun Pn and each hypothesis is assigned a probability that indicates a likelihood for a respective hypothesis y. At operation 406, the method 400 determines that a probability associated with a hypothesis y satisfies a penalty criteria. The penalty criteria indicates that (i) the probability satisfies a probability threshold and (ii) the hypothesis incorrectly represents the proper noun. At operation 408, the method 400 applies a penalty 332 to the minimum word error rate loss function.

FIG. 5 is schematic view of an example computing device 500 that may be used to implement the systems (e.g., the speech recognizer 200) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 540, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing to perform operations comprising:
   training a speech recognition model with a minimum word error rate loss function by:
      receiving a training example comprising a ground-truth transcription, the ground-truth transcription comprising a word sequence that includes a proper noun;
      generating a plurality of hypotheses corresponding to the training example, each hypothesis of the plurality of hypotheses comprising a respective sequence of words and a corresponding probability that indicates a likelihood that the hypothesis correctly identifies the ground-truth transcription;
      determining that the corresponding probability associated with one of the plurality of hypotheses satisfies a penalty criteria, the penalty criteria indicating that:
         the corresponding probability exceeds a value assigned to a probability threshold; and
         the respective sequence of words of the associated hypothesis does not include the proper noun; and
      applying a penalty to the minimum word error rate loss function based on the corresponding probability associated with the one of the plurality of hypotheses satisfying the penalty criteria.

2. The computer-implemented method of claim 1, wherein the corresponding probability exceeds the value assigned to the probability threshold when the corresponding probability is greater than the corresponding probabilities associated with the other hypothesis.

3. The computer-implemented method of claim 1, wherein the speech recognition model comprises a two-pass architecture comprising:
   a first pass network comprising a recurrent neural network transducer (RNN-T) decoder; and
   a second pass network comprising a listen-attend-spell (LAS) decoder.

4. The computer-implemented method of claim 3, wherein the speech recognition model further comprises a shared encoder, the shared encoder encoding acoustic frames for each of the first pass network and the second pass network.

5. The computer-implemented method of claim 3, wherein training with the minimum word error rate loss function occurs at the LAS decoder.

6. The computer-implemented method of claim 3, wherein the operations further comprise:
   training the RNN-T decoder; and
   prior to training the LAS decoder with the minimum word error rate loss function, training the LAS decoder while parameters of the trained RNN-T decoder remain fixed.

7. The computer-implemented method of claim 1, wherein the operations further comprise assigning the corresponding probability to each hypothesis of the plurality of hypotheses.

8. The computer-implemented method of claim 1, wherein the operations further comprise:
   receiving an incorrect hypothesis; and
   assigning a respective probability to the incorrect hypothesis, wherein the penalty criteria further comprises an indication that the hypothesis includes the incorrect hypothesis.

9. The computer-implemented method of claim 8, wherein the incorrect hypothesis comprises a phonetically similarity to the proper noun.

10. The computer-implemented method of claim 8, wherein the operations further comprise substituting the incorrect hypothesis for a generated hypothesis of the plurality of hypotheses.

11. A system comprising:
data processing hardware; and
memory hardware in communication with the data processing hardware, the memory hardware storing instructions that when executed on the data processing hardware cause the data processing hardware to perform operations comprising:
training a speech recognition model with a minimum word error rate loss function by:
receiving a training example comprising a ground-truth transcription, the ground-truth transcription comprising a word sequence that includes a proper noun;
generating a plurality of hypotheses corresponding to the training example, each hypothesis of the plurality of hypotheses comprising a respective sequence of words and a corresponding probability that indicates a likelihood that the hypothesis correctly identifies the ground-truth transcription;
determining that the corresponding probability associated with one of the plurality of hypotheses satisfies a penalty criteria, the penalty criteria indicating that:
the corresponding probability exceeds a value assigned to a probability threshold; and
the respective sequence of words of the associated hypothesis does not include the proper noun; and
applying a penalty to the minimum word error rate loss function based on the corresponding probability associated with the one of the plurality of hypotheses satisfying the penalty criteria.

12. The system of claim 11, wherein the corresponding probability exceeds the value assigned to the probability threshold when the corresponding probability is greater than the corresponding probabilities associated with the other hypothesis.

13. The system of claim 11, further comprising:
a first pass network comprising a recurrent neural network transducer (RNN-T) decoder; and
a second pass network comprising a listen-attend-spell (LAS) decoder,
wherein the speech recognition model comprises the first pass network and the second pass network.

14. The system of claim 13, further comprising a shared encoder configured to encode acoustic frames for each of the first pass network and the second pass network.

15. The system of claim 13, wherein training with the minimum word error rate loss function occurs at the LAS decoder.

16. The system of claim 13, wherein the operations further comprise:
training the RNN-T decoder; and
prior to training the LAS decoder with the minimum word error rate loss function, training the LAS decoder while parameters of the trained RNN-T decoder remain fixed.

17. The system of claim 11, wherein the operations further comprise assigning the corresponding probability to each hypothesis of the plurality of hypotheses.

18. The system of claim 11, wherein the operations further comprise:
receiving an incorrect hypothesis; and
assigning a respective probability to the incorrect hypothesis,
wherein the penalty criteria further comprises an indication that the hypothesis includes the incorrect hypothesis.

19. The system of claim 18, wherein the incorrect hypothesis comprises a phonetically similarity to the proper noun.

20. The system of claim 18, wherein the operations further comprise substituting the incorrect hypothesis for a generated hypothesis of the plurality of hypotheses.

* * * * *